United States Patent
Yamamoto et al.

(10) Patent No.: US 11,061,288 B2
(45) Date of Patent: *Jul. 13, 2021

(54) LIQUID CRYSTAL DISPLAY DEVICE

(71) Applicants: Japan Display Inc., Tokyo (JP); Panasonic Liquid Crystal Display Co., Ltd., Hyogo-ken (JP)

(72) Inventors: Takashi Yamamoto, Chiba (JP); Tomoya Sugano, Mobara (JP); Takamitsu Kamada, Mobara (JP)

(73) Assignees: Japan Display Inc., Tokyo (JP); Panasonic Liquid Crystal Display Co., Ltd., Hyogo-ken (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/727,043

(22) Filed: Dec. 26, 2019

(65) Prior Publication Data

US 2020/0133045 A1    Apr. 30, 2020

Related U.S. Application Data

(63) Continuation of application No. 16/448,321, filed on Jun. 21, 2019, now Pat. No. 10,558,091, which is a (Continued)

(30) Foreign Application Priority Data

Jul. 8, 2009 (JP) .............................. JP2009-161610

(51) Int. Cl.
*G02F 1/1339* (2006.01)
*G02F 1/1335* (2006.01)
*G02F 1/1345* (2006.01)
*G02F 1/1362* (2006.01)
*G02F 1/1337* (2006.01)
*G02F 1/1333* (2006.01)

(52) U.S. Cl.
CPC ........ *G02F 1/13394* (2013.01); *G02F 1/1337* (2013.01); *G02F 1/1339* (2013.01);
(Continued)

(58) Field of Classification Search
CPC .......... G02F 1/13452; G02F 1/136286; G02F 2001/133388; G02F 2001/13396; G02F 1/13394; G02F 1/1339
See application file for complete search history.

(56) References Cited

U.S. PATENT DOCUMENTS

| 6,357,763 | B2 | 3/2002 | Mathew et al. |
| 6,384,882 | B1 | 5/2002 | Nagayama et al. |

(Continued)

FOREIGN PATENT DOCUMENTS

| JP | 2001-174827 A | 6/2001 |
| JP | 2002-107735 A | 4/2002 |

(Continued)

*Primary Examiner* — Jessica M Merlin
(74) *Attorney, Agent, or Firm* — Michael Best & Friedrich LLP

(57) ABSTRACT

A liquid crystal display device includes a TFT substrate having a display region where pixels each having a TFT and a pixel electrode are formed in a matrix, a counter substrate having a display region where color filters of three colors are formed in a matrix, the TFT substrate and the counter substrate being bonded together with a sealing material in a seal portion at a periphery, and liquid crystal sealed between the TFT substrate and the counter substrate by the seal material. In the display region, a first insulation film, a first alignment film, a first columnar spacer, an overcoat film, a first color filter among the color filters of three colors are stacked in this order between the TFT substrate and the counter substrate.

10 Claims, 17 Drawing Sheets

Related U.S. Application Data continuation of application No. 15/693,716, filed on Sep. 1, 2017, now Pat. No. 10,371,990, which is a continuation of application No. 14/615,403, filed on Feb. 5, 2015, now Pat. No. 9,778,522, which is a continuation of application No. 14/166,258, filed on Jan. 28, 2014, now Pat. No. 9,069,218, which is a continuation of application No. 12/832,193, filed on Jul. 8, 2010, now Pat. No. 8,643,819.

(52) U.S. Cl.
CPC .... *G02F 1/13452* (2013.01); *G02F 1/133514* (2013.01); *G02F 1/136286* (2013.01); *G02F 1/13396* (2021.01); *G02F 1/133388* (2021.01)

(56) References Cited

U.S. PATENT DOCUMENTS

| | | | |
|---|---|---|---|
| 6,724,458 | B2 | 4/2004 | Kim et al. |
| 7,248,328 | B1 | 7/2007 | Shibahara |
| 7,630,050 | B2 | 12/2009 | Kobayashi et al. |
| 8,643,819 | B2 * | 2/2014 | Yamamoto .......... G02F 1/13394 349/153 |
| 9,069,218 | B2 * | 6/2015 | Yamamoto ............ G02F 1/1337 |
| 10,558,091 | B2 * | 2/2020 | Yamamoto ........ G02F 1/133514 |
| 2003/0112404 | A1 | 6/2003 | Kim |
| 2003/0137631 | A1 | 7/2003 | Nakayoshi et al. |
| 2004/0201799 | A1 | 10/2004 | Nakayoshi et al. |
| 2005/0243261 | A1 | 11/2005 | Chiang et al. |
| 2005/0286006 | A1 | 12/2005 | Yanagawa |
| 2006/0158599 | A1 | 7/2006 | Koo |
| 2007/0182912 | A1 | 8/2007 | Kobayashi et al. |
| 2008/0062374 | A1 | 3/2008 | Katsumura et al. |
| 2008/0174710 | A1 | 7/2008 | Murakami et al. |
| 2009/0066903 | A1 | 3/2009 | Yoshida et al. |

FOREIGN PATENT DOCUMENTS

| | | |
|---|---|---|
| JP | 2006-267782 A | 10/2006 |
| JP | 2007-212667 A | 8/2007 |
| JP | 2008-145461 A | 6/2008 |

\* cited by examiner

A-A

LIQUID CRYSTAL DISPLAY DEVICE

CROSS-REFERENCE TO RELATED APPLICATIONS

This application is a continuation of U.S. patent application Ser. No. 16/448,321, filed on Jun. 21, 2019, which, in turn, is a continuation of U.S. patent application Ser. No. 15/693,716, (now U.S. Pat. No. 10,371,990) filed on Sep. 1, 2017, which, in turn, is a continuation of U.S. patent application Ser. No. 14/615,403 (now U.S. Pat. No. 9,778,522), filed on Feb. 5, 2015, which, in turn, is a continuation of U.S. patent application Ser. No. 14/166,258 (now U.S. Pat. No. 9,069,218), filed on Jan. 28, 2014, which, in turn, is a continuation of U.S. patent application Ser. No. 12/832,193 (now U.S. Pat. No. 8,643,819), filed on Jul. 8, 2010, the entire contents of which are incorporated herein by reference.

CLAIM OF PRIORITY

The present application claims priority from Japanese application serial No. 2009-161610 filed on Jul. 8, 2009, the content of which is hereby incorporated by reference into this application.

BACKGROUND OF THE INVENTION

1. Field of the Invention

The present invention relates to a liquid crystal display device and more particularly to a liquid crystal display device which does not cause air bubbles or liquid crystal leakage and thus is improved in reliability in a configuration of filling liquid crystal between a TFT substrate and a counter substrate by a one drop fill method.

2. Description of the Related Art

In liquid crystal display devices, liquid crystal is filled between a TFT substrate on which pixels each having a pixel electrode and a thin film transistor (TFT) are formed in a matrix and a counter substrate on which color filters and the like are formed, and an image is formed by controlling the molecules of the liquid crystal by an electric field. The gap between the TFT substrate and the counter substrate is as extremely small as several microns. In the conventional filling method of liquid crystal, the space between the TFT substrate and the counter substrate is sealed to create a vacuum within the space, and liquid crystal is injected by means of atmospheric pressure.

However, when the gap between the TFT substrate and the counter substrate is small, and the display area of the liquid crystal display device is large, the injection requires a great deal of time, which lengthens manufacturing throughput and thus increases the manufacturing cost. For addressing the problem, for example, a technique of sealing liquid crystal has been developed in which a required amount of liquid crystal is dropped onto the counter substrate, and thereafter the counter substrate and the TFT substrate are overlapped and sealed.

Such a one drop fill method has been conventionally employed for relatively large liquid crystal display devices and has started to be used for small liquid crystal display devices. In small liquid crystal display devices, a number of liquid crystal cells are formed on a mother substrate, and liquid crystal has to be sealed in each of the liquid crystal cells. However, a number of man-hours are required for sealing liquid crystal into the individual liquid crystal cells. According to the one drop fill method, liquid crystal can be injected into a number of liquid crystal cells at one time in the mother substrate.

In the specification, while the "liquid crystal cell" refers to one in a state where the TFT substrate and the counter substrate are sealed with a sealing material, and liquid crystal is sealed therebetween, the "liquid crystal display device" refers to one on which a drive IC for driving liquid crystal is mounted on the liquid crystal cell. However, they are sometimes used with no distinction.

In liquid crystal display devices, it is important to control the gap between the TFT substrate and the counter substrate. Conventionally, the gap is controlled by columnar spacers formed on the counter substrate in a display region and controlled by glass fibers in a seal portion.

On the other hand, JP-A-2001-174827 discloses a configuration of a liquid crystal display device in which columnar spacers are used in a display region, and columnar spacers are used also in a seal portion. JP-A-2001-174827 describes a configuration in which columnar spacers are formed on BM both in the display region and in the seal portion, so that the gap between the substrates in the display region is the same as that of the seal portion.

On the other hand, the adhesion between the sealing material, and the TFT substrate and the counter substrate in the seal portion is important for reliability. JP-A-2007-212667 describes a configuration in which, for preventing the intrusion of liquid crystal between the sealing material and the lower surface of the TFT substrate or the counter substrate in the seal portion, a weir serving as a stopper against liquid crystal is formed.

FIG. 14 is a plan view showing a state of a mother substrate 1000 for manufacturing small liquid crystal display devices. In FIG. 14, the mother substrate 1000 is formed by overlapping a mother TFT substrate and a mother counter substrate. In the mother substrate 1000, 7.5=35 pieces of liquid crystal cells 1 are fabricated. In FIG. 14, scribe lines 2 for separating the mother substrate into the individual liquid crystal cells 1 are marked, and a sealing material 20 is formed for each of the liquid crystal cells 1. Liquid crystal is dropped in a region inside the sealing material 20 and sealed with the sealing material 20.

In small liquid crystal display devices, a glass substrate is required to be thin. A glass substrate serving as a mother TFT substrate or a mother counter substrate is standardized and is as thick as about 0.5 mm. Therefore, after forming the mother substrate 1000, the mother substrate 1000 is reduced in thickness by polishing the outer surface thereof. In this case, for preventing a polishing solution from entering the inside of the mother substrate 1000, a mother substrate sealing material 2000 is formed at the peripheries of the mother TFT substrate and the mother counter substrate. Thereafter, the individual liquid crystal cells 1 are separated from the mother substrate 1000 along the scribe lines 2.

In the liquid crystal one drop fill method, the amount of liquid crystal to be dropped is very important. When liquid crystal is dropped onto the mother counter substrate, an accurately controlled amount of liquid crystal is dropped in a region surrounded by the sealing material 20 formed in the individual liquid crystal cell 1. Thereafter, the liquid crystal is covered with the mother TFT substrate, and the mother TFT substrate and the mother counter substrate are bonded together with the sealing materials 20 and the mother substrate sealing material 2000. In this case, when the amount of liquid crystal to be dropped is too small, air bubbles are generated in the liquid crystal cell 1, and when the amount of liquid crystal to be dropped is too large, liquid crystal enters between the sealing material 20 and the TFT substrate or between the sealing material 20 and the counter substrate, causing sealing defects.

The capacity of the inside of the liquid crystal cell 1 is determined by the height of a columnar spacer 205 formed in the display region. As the height of the columnar spacer 205 is greater, the capacity of the inside becomes large, and as the height of the columnar spacer 205 is smaller, the capacity of the inside becomes small. Accordingly, a proper dropping amount of liquid crystal varies depending on the height of the columnar spacer 205. However, the height of the columnar spacer 205 changes depending on the process.

For addressing the problem, the height of the columnar spacer 205 formed on the counter substrate 200 is conventionally measured in each of the counter substrates 200, the counter substrates 200 are divided into groups according to the height of the columnar spacer 205, and the dropping amount of liquid crystal to be dropped onto the counter substrate 200 is determined in each of the groups.

Although the gap between the TFT substrate 100 and the counter substrate 200 is determined by the columnar spacers 205 in the display region, the gap between the TFT substrate 100 and the counter substrate 200 is conventionally determined by glass fibers 250 in the seal portion. FIG. 15 is a schematic cross-sectional view showing this state. In FIG. 15, a black matrix 202 and an overcoat film 203 are formed on the counter substrate 200 side, and an inorganic passivation film 107 and an organic passivation film 108 are formed on the TFT substrate 100 side. FIG. 15 is a schematic view, and therefore the other layers are not illustrated.

In the display region indicated by DA in FIG. 15, the gap between the counter substrate 200 and the TFT substrate 100 is determined by the columnar spacers 205 and determined in the seal portion by the diameter of the glass fiber 250 mixed in the sealing material. In FIG. 15, liquid crystal 300 is sealed inside the sealing material.

Although a height HS of the columnar spacer 205 varies depending on the process, a diameter GH of the glass fiber 250 is controlled with relatively high accuracy. When the counter substrates 200 are divided into groups according to the height of the columnar spacer 205, they are divided into three groups: a group where the height HS of the columnar spacer 205 is substantially the same as the diameter GH of the glass fiber 250; a group where the height HS of the columnar spacer 205 is smaller than the diameter GH of the glass fiber 250; and a group where the height HS of the columnar spacer 205 is greater than the diameter HG of the glass fiber 250.

FIG. 16 is a cross-sectional view showing a state of the liquid crystal cell 1 of the group where the height HS of the columnar spacer 205 is substantially the same as the diameter GH of the glass fiber 250. In the example of FIG. 16, the amount of the liquid crystal 300 is properly controlled, and therefore the reliability of the seal portion can be maintained at a high level. FIG. 17 is a cross-sectional view of the liquid crystal cell 1 in the group where the height HS of the columnar spacer 205 is smaller than the diameter GH of the glass fiber 250. Since the dropping amount of liquid crystal is determined by the height of the columnar spacer 205, an air bubble 400 is generated in this group like a region A at the periphery shown in FIG. 17.

FIG. 18 is a cross-sectional view of the liquid crystal cell 1 in the group where the height HS of the columnar spacer 205 is greater than the diameter HG of the glass fiber 250. Since the dropping amount of the liquid crystal 300 is determined by the height of the columnar spacer 205, tilting occurs in the seal portion and the substrate warps outward in this group as indicated by a region B at the periphery shown in FIG. 18. Although only the counter substrate 200 is warped in FIG. 18, FIG. 18 is a schematic view, and actually the TFT substrate 100 side also warps.

FIG. 19 is a schematic view showing why tilting of the substrate occurs in the seal portion. Dropping of liquid crystal is conducted under reduced pressure. Liquid crystal is dropped onto each of the liquid crystal cells 1, the TFT substrate 100 and the counter substrate 200 are overlapped each other, the sealing material is cured, and thereafter the TFT substrate 100 and the counter substrate 200 are returned to the air. Since a reduced pressure region 450 is formed between the liquid crystal cell 1 and the liquid crystal cell 1, that is, between the sealing material and the sealing material, the substrate is deformed inward by atmospheric pressure indicated by open arrows. On the other hand, since the liquid crystal 300 is excessively dropped and sealed in a region inside the sealing material, that is, on the liquid crystal cell 1 side, the substrate is deformed outward. Accordingly, tilting of the substrate occurs in the seal portion.

When the mother substrate 1000 in this state is separated along the scribe line 2, the liquid crystal cell 1 has a cross-sectional shape shown in FIG. 18. When the TFT substrate 100 or the counter substrate 200 is reduced in thickness by polishing, the deformation of the substrate shown in FIG. 18 is likely to occur. As described above, when the liquid crystal 300 is excessively sealed, the reliability of the seal portion is impaired, and the contrast is reduced by a change in gap between the TFT substrate 100 and the counter substrate 200 at the periphery of the display region.

SUMMARY OF THE INVENTION

In the conventional method as described above, even when the height of the columnar spacer 205 is measured to divide the counter substrates 200 into groups according to the height of the columnar spacer 205, and the amount of liquid crystal to be dropped is controlled in each of the groups, the air bubbles 400 due to too little liquid crystal and the deformation of the substrate due to excessive liquid crystal are caused at a certain rate. It is an object of the invention to solve the above-described problem and realize a liquid crystal display device with high reliability.

To achieve the object, the invention is specifically configured as follows.

(1) A liquid crystal display device includes: a TFT substrate having a display region where pixels each having a TFT and a pixel electrode are formed in a matrix; a counter substrate having a display region where color filters of three colors are formed in a matrix, the TFT substrate and the counter substrate being bonded together with a sealing material in a seal portion at a periphery; and liquid crystal sealed between the TFT substrate and the counter substrate, wherein in the display region, a gap between the counter substrate and the TFT substrate is defined by a first columnar spacer formed on the counter substrate, and one color filter among the color filters of three colors is present below the first columnar spacer; and in the seal portion, a gap between the counter substrate and the TFT substrate is defined by a second columnar spacer formed on the counter substrate, a first color filter among the color filters of three colors is formed in an island shape below the second columnar spacer, and a second color filter is stacked and formed in an island shape on the first color filter.

(2) The liquid crystal display device according to (1), wherein an overcoat film is present between the first columnar spacer and the color filter in the display region, and an overcoat film is present between the second columnar spacer and the second color filter in the seal portion.

(3) The liquid crystal display device according to claim 1, wherein the first color filter is a green color filter, and the second color filter is a blue color filter.

(4) A liquid crystal display device includes: a TFT substrate having a display region where pixels each having a TFT and a pixel electrode are formed in a matrix; a counter substrate having a display region where color filters of three colors are formed in a matrix, the TFT substrate and the counter substrate being bonded together with a sealing material in a seal portion at a periphery; and liquid crystal sealed between the TFT substrate and the counter substrate, wherein in the display region, a gap between the counter substrate and the TFT substrate is defined by a first columnar spacer formed on the counter substrate, and one color filter among the color filters of three colors is present below the first columnar spacer; and in the seal portion, a gap between the counter substrate and the TFT substrate is defined by a second columnar spacer formed on the counter substrate, a first color filter among the color filters of three colors is formed in an island shape below the second columnar spacer, a second color filter is stacked and formed in an island shape on the first color filter, and a third color filter is stacked and formed in an island shape on the second color filter.

(5) The liquid crystal display device according to (4), wherein an overcoat film is present between the first columnar spacer and the color filter in the display region, and an overcoat film is present between the second columnar spacer and the third color filter in the seal portion.

(6) The liquid crystal display device according to (4), wherein the first color filter is a red color filter, the second color filter is a green color filter, and the third color filter is a blue color filter.

(7) A liquid crystal display device includes: a TFT substrate having a display region where pixels each having a TFT and a pixel electrode are formed in a matrix; a counter substrate having a display region where color filters of three colors are formed in a matrix, the TFT substrate and the counter substrate being bonded together with a sealing material in a seal portion at a periphery; and liquid crystal sealed between the TFT substrate and the counter substrate, wherein in the display region, a gap between the counter substrate and the TFT substrate is defined by a first columnar spacer formed on the counter substrate, and one color filter among the color filters of three colors is present below the first columnar spacer; in the seal portion, a gap between the counter substrate and the TFT substrate is defined by a second columnar spacer formed on the counter substrate, a first color filter among the color filters of three colors is formed in an island shape below the second columnar spacer, and a second color filter is stacked and formed in an island shape on the first color filter; and in the seal portion, a weir formed on the counter substrate is formed so as to surround the display region, and the color filters are not present below the weir.

According to an aspect of the invention, the difference between the gap between the TFT substrate and the counter substrate in the display region and the gap between the TFT substrate and the counter substrate in the seal portion can be eliminated or can be always maintained at a fixed value. Accordingly, in a liquid crystal display device of a type which injects liquid crystal by a one drop fill method, the reliability of the seal portion can be improved. Moreover, the generation of air bubbles in the display region can be prevented.

DETAILED DESCRIPTION OF THE INVENTION

Hereinafter, the contents of the invention will be described in detail based on embodiments.

First Embodiment

Figure 1:
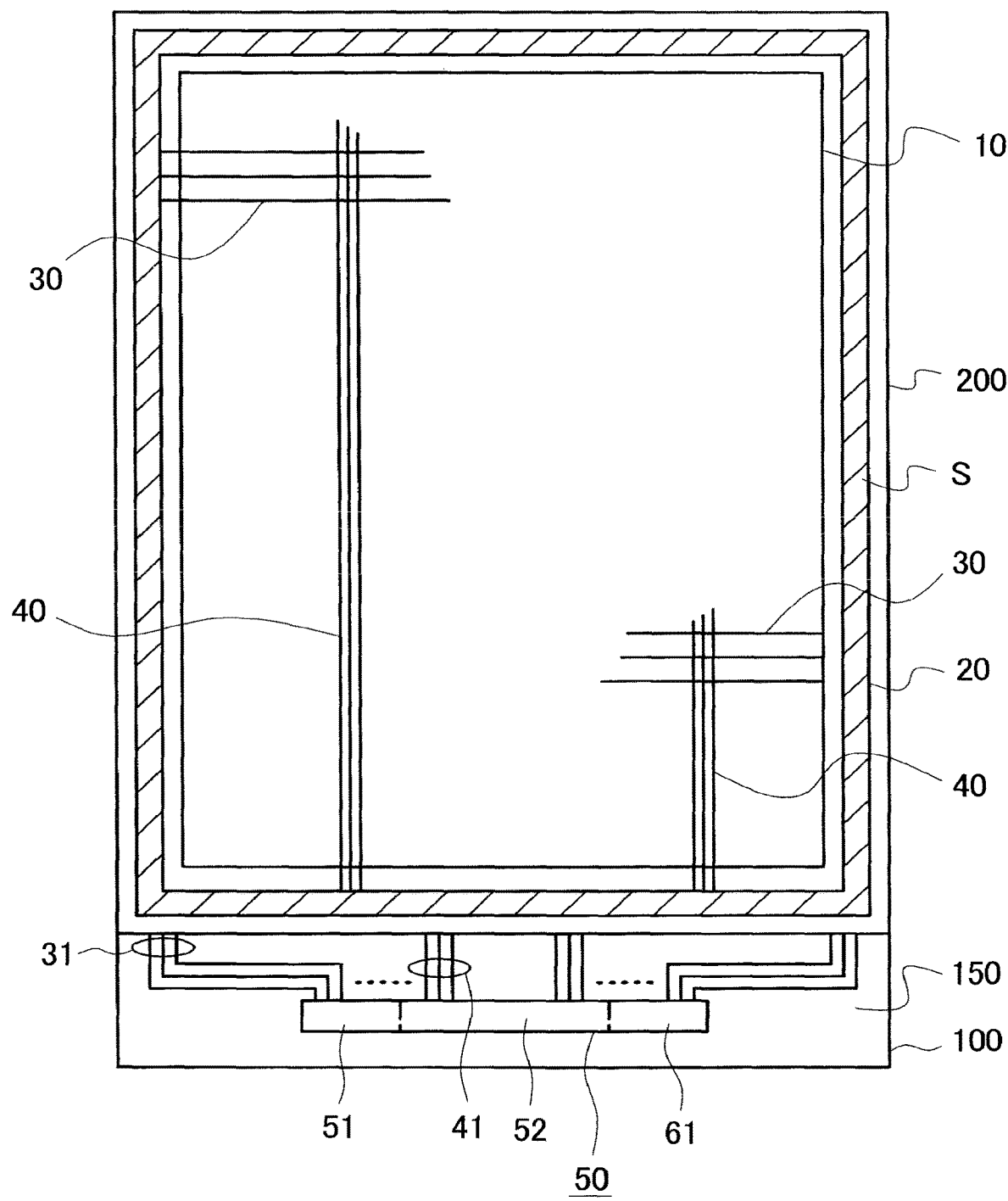
FIG. 1 is a plan view of a liquid crystal display device.

FIG. 1 is a plan view of a small liquid crystal display device used for mobile phones or the like as an example of a product to which the invention is applied. In FIG. 1, a counter substrate 200 is disposed above a TFT substrate 100. A liquid crystal layer is interposed between the TFT substrate and the counter substrate. The TFT substrate and the counter substrate are bonded together with a sealing material 20 formed in a frame portion. In FIG. 1, since liquid crystal is sealed by a one drop fill method, a filling port is not formed.

The TFT substrate 100 is formed larger than the counter substrate 200. In a portion of the TFT substrate 100 extended from the counter substrate 200, a terminal portion 150 for supplying a power supply, video signals, scanning signals, and the like to a liquid crystal cell 1 is formed.

In the terminal portion 150, an IC driver 50 for driving scanning lines, video signal lines, and the like is disposed. The IC driver 50 is divided into three regions. At the center of the IC driver, a video signal drive circuit 52 is disposed. A scanning signal drive circuit 51 is disposed on both sides of the center.

In a display region 10 of FIG. 1, scanning lines 30 extend in the horizontal direction and are arranged in the vertical direction. Moreover, video signal lines 40 extend in the vertical direction and are arranged in the horizontal direction. The scanning lines are connected to the scanning signal drive circuit 51 of the IC driver 50 through scanning-line lead lines 31. In FIG. 1, for arranging the display region 10 at the center of the liquid crystal display device, the scanning-line lead lines 31 are arranged on both sides of the display region 10. Therefore, the scanning signal drive circuit 51 is disposed on both sides in the IC driver 50. On the other hand, video-signal-line lead lines 41 which connect the video signal lines with the IC driver 50 are collected on the lower side of a screen. The video-signal-line lead lines 41 are connected to the video signal drive circuit 52 arranged at the central portion of the IC driver 50.

Figure 2:
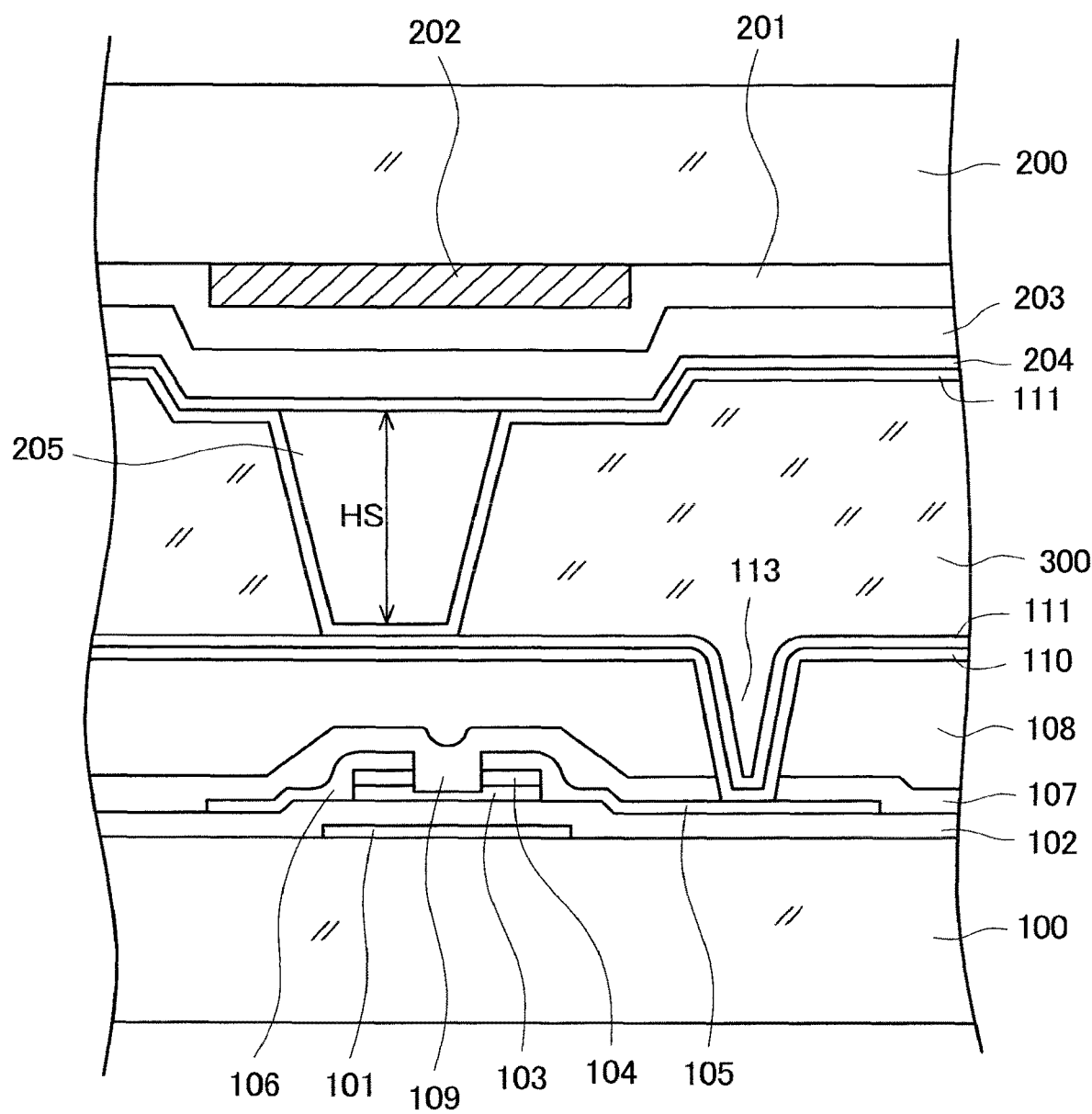
FIG. 2 is a cross-sectional view of a display region of the liquid crystal display device.

FIG. 2 is a cross-sectional view of the display region of the liquid crystal display device shown in FIG. 1. FIG. 2 shows a cross-sectional view of the display region of the liquid crystal display device of a typical TN type. However, the invention can be applied not only to TN type liquid crystal display devices but also to another type liquid crystal display devices such as of in-plane switching (IPS) type.

In FIG. 2, a gate electrode 101 is formed on the TFT substrate 100. The gate electrode 101 is formed by sputtering and thereafter patterned by photolithography. The gate electrode 101 is formed of Al and has a thickness of about 300 nm.

The scanning lines, which are not shown, and the like are formed simultaneously with and in the same layer as the gate electrode 101. A common wiring formed on the TFT substrate 100 for supplying a common voltage to a counter electrode 204 of the counter substrate 200 is also formed simultaneously in the same layer. A gate insulating film 102 is formed so as to cover the gate electrode 101. The gate insulating film 102 is formed by, for example, sputtering a SiN film. The gate insulating film 102 has a thickness of about 400 nm, for example.

A semiconductor layer 103 is formed above the gate electrode 101 via the gate insulating film 102. The semiconductor layer 103 is formed of a-Si and has a thickness of about 150 nm. A channel region of a TFT is formed in the a-Si layer. Before disposing a source electrode 105 and a drain electrode 106 on the a-Si layer, an n+Si layer 104 is formed for establishing ohmic contact between the a-Si layer and the source electrode 105 or the drain electrode 106.

The source electrode 105 or the drain electrode 106 is formed on the n+Si layer 104. In the same layer as the source electrode 105 or the drain electrode 106, a ground wire and the like connected to the video signal line, a protective diode, and the like are formed. The source electrode 105 or the drain electrode 106 is formed of Mo, Al, or the like. In the case of using Al, the upper and lower surfaces of an Al layer are covered with a Mo layer or the like. This is because when Al is in contact with ITO or the like in a contact hole 113 portion, a contact resistance sometimes becomes unstable.

After forming the source electrode 105 or the drain electrode 106, channel etching is conducted using the source electrode 105 and the drain electrode 106 as masks. Etching is conducted to the upper portion of the a-Si layer for completely removing the n+Si layer 104 from the channel layer, so that a channel-etching region 109 is formed. Thereafter, an inorganic passivation film 107 is formed so as to cover the entire TFT. The inorganic passivation film 107 is formed of SiN. The inorganic passivation film 107 has a thickness of about 400 nm, for example.

An organic passivation film 108 is formed so as to cover the inorganic passivation film 107. Since the organic passivation film 108 functions as a planarization film, it is formed thick. The organic passivation film 108 is formed to a thickness of about from 2 µm to 3 µm. An acrylic resin is used for the organic passivation film 108, for example. Since a photosensitive acrylic resin is used for the organic passivation film 108, patterning can be conducted without using a resist.

Thereafter, the contact hole 113 is formed through the organic passivation film 108 and the inorganic passivation film 107 for establishing electrical continuity between a pixel electrode 110 formed of ITO and the source electrode 105 of the TFT. In the display region 10, an ITO film serving as the pixel electrode 110 is formed on the organic passivation film 108.

In FIG. 2, an alignment film 111 for aligning liquid crystal molecules is formed on the pixel electrode 110. A liquid crystal layer 300 is interposed between the TFT substrate 100 and the counter substrate 200. Initial alignment of liquid crystal molecules in the liquid crystal layer 300 is defined by the alignment film 111 formed on the TFT substrate 100 and an alignment film 111 formed on the counter substrate 200.

In FIG. 2, a black matrix 202 as a light shielding film is formed on the inner side of the counter substrate 200 so as to correspond to the position of the TFT. The black matrix functions as a light shielding film for the TFT and functions to improve the contrast of an image. A color filter 201 is formed at a portion where the black matrix 202 is not formed, that is, a portion forming a pixel.

In the pixel structure of FIG. 2, the color filters 201 of the same color are formed in a stripe in the vertical direction as will be described later. The black matrixes are formed in a stripe in the horizontal direction corresponding to the scanning lines 30 formed on the TFT substrate 100. The color filters 201 are continuously formed in a stripe in the vertical direction so as to cover the black matrixes 202.

An overcoat film 203 is formed so as to cover the color filter 201 and the black matrix 202. The overcoat film 203 functions to moderate irregularities on the surface and functions to protect the color filter against liquid crystal. However, the overcoat film is not essential and may not be used.

The counter electrode 204 is formed of an ITO film as a transparent conductive film on the overcoat film 203. Voltage is applied between the pixel electrode 110 formed in the pixel of the TFT substrate 100 and the counter electrode 204 formed on the counter substrate 200 to rotate liquid crystal molecules, thereby controlling transmission light or reflection light to form an image.

A columnar spacer 205 for defining the gap between the counter substrate 200 and the TFT substrate 100 is formed on the counter electrode 204. The columnar spacer 205 is formed at a portion where the black matrix 202 is formed and through which light of a backlight or the like does not transmit. This is because the alignment of liquid crystal is disturbed at the portion where the columnar spacer 205 is present to cause light leakage from the backlight or the like, thereby reducing the contrast.

The columnar spacer 205 has a height of, for example, from 3 μm to 4 μm, which is the same as the thickness of the liquid crystal layer 300. The columnar spacer 205 is formed of a photosensitive acrylic resin, for example. When an acrylic resin is applied on the entire surface of the counter substrate 200 and exposed to light through a mask, only a portion exposed to light is rendered insoluble in a developer, and only the exposed portion is left as the columnar spacer 205. Use of a photosensitive resin eliminates a resist step, thereby shortening the process.

The alignment film 111 is formed so as to cover the columnar spacer 205 and the counter electrode 204. Initial alignment of the liquid crystal layer 300 is determined by the alignment film 111 formed on the TFT substrate 100 and the alignment film 111 formed on the counter substrate 200. This alignment state is changed by rotating liquid crystal molecules with voltage applied between the pixel electrode 110 formed on the TFT substrate 100 and the counter substrate 200, thereby controlling light transmitting through the liquid crystal layer 300 to form an image.

Figure 3:
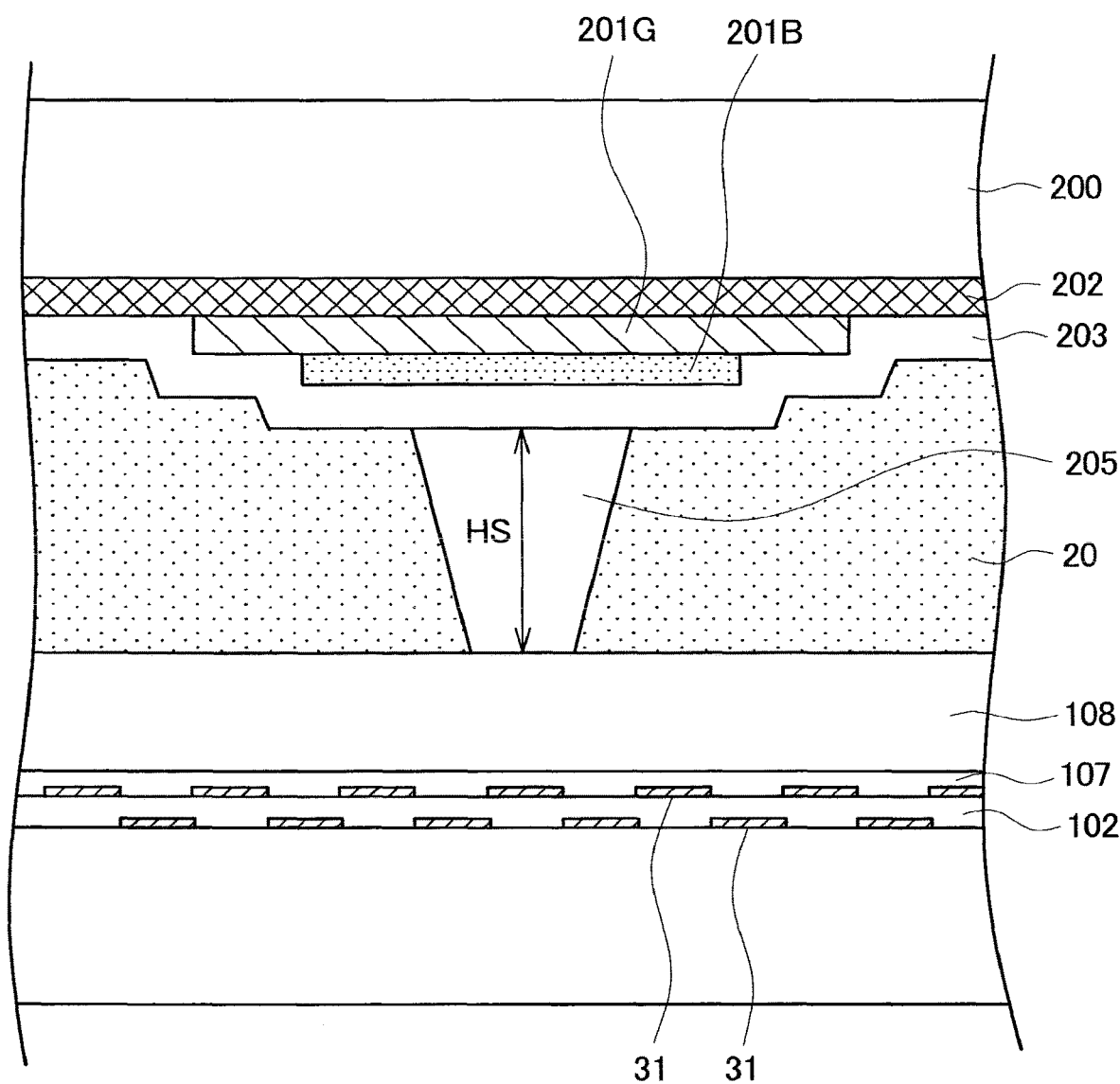
FIG. 3 is a cross-sectional view of a seal portion of a liquid crystal display device according to a first embodiment.

FIG. 3 is a cross-sectional view of a region S formed with the sealing material of the liquid crystal display device shown in FIG. 1, showing a feature of the invention. In FIG. 3, the scanning-line lead lines 31 are formed on the TFT substrate 100, and the gate insulating film 102 covers the scanning-line lead lines 31. Scanning-line lead lines 31 formed in a different layer are formed on the gate insulating film 102. Although the scanning-line lead lines 31 extend in the vertical direction in the portion S in FIG. 1, the scanning-line lead lines 31 are formed in two layers for reducing the area outside the display region (frame region) of the liquid crystal display device. The upper scanning-line lead lines 31 are formed in the same layer as the video signal lines 40 and connected to the scanning lines 30 at a not-shown portion via through holes.

The inorganic passivation film 107 is formed so as to cover the scanning-line lead lines 31 in the second layer. The organic passivation film 108 is formed so as to cover the inorganic passivation film 107. In the seal portion, the pixel electrode 110 and the alignment film 111 are not formed on the organic passivation film 108.

On the counter substrate 200 in FIG. 3, the black matrix 202 is formed. On the black matrix 202, a green color filter 201G and a blue color filter 201B are stacked and formed in an island shape. The green color filter 201G is formed larger than the blue color filter 201B. The overcoat film 203 is formed so as to cover the green color filter 201G and the blue color filter 201B. In the seal portion, the counter electrode 204 and the alignment film 111 are not formed on the overcoat film 203.

In FIG. 3, the columnar spacer 205 is formed on the overcoat film 203. The sealing material 20 is filled around the columnar spacer 205. A tip end of the columnar spacer 205 is in contact with the organic passivation film 108 formed on the TFT substrate 100. In the invention, the gap between the TFT substrate 100 and the counter substrate 200 is defined by the columnar spacer 205 also in the seal portion.

The columnar spacer 205 in FIG. 3 is formed simultaneously with and by the same process as the columnar spacer 205 in the display region described with reference to FIG. 2.

Accordingly, even when a height HS of the columnar spacer 205 varies due to process variations, the height varies simultaneously in the display region and the seal portion. Therefore, the difference between the gap between the TFT substrate 100 and the counter substrate 200 in the display region and the gap in the seal portion does not change depending on the process.

A feather of the invention is in that the island-shaped color filter 201 having two layers is disposed below the columnar spacer 205. As described with reference to FIG. 2, the color filter 201 having one layer is formed below the columnar spacer 205 in the display region. In the invention, for assuring the reliability of the seal portion, the color filter 201 is not formed on the entire surface of the seal portion but is formed in an island shape. The overcoat film 203 is formed so as to cover the color filter 201 formed in an island shape.

Even when the color filter is manufactured under the same process conditions, the thickness thereof is smaller when it is formed in an island shape like in the seal portion than when it is formed wide in a stripe shape like in the display region. The overcoat film 203 on the color filter becomes thin when it is formed on the island-shaped color filter due to leveling effect. Accordingly, even when the height HS of the columnar spacer 205 is controlled so as to be the same in the display region and in the seal portion, the thickness of the color filter formed in an island shape and the thickness of the overcoat film 203 are reduced in the seal portion. Therefore, such a phenomenon occurs in the seal portion that the gap between the TFT substrate 100 and the counter substrate 200 is reduced.

In the invention, two layers of the island-shaped color filters 201G and 201B are formed below the columnar spacer 205 in the seal portion, whereby the gap between the TFT substrate 100 and the counter substrate 200 is controlled so as to be uniform in the display region and in the seal portion. As shown in FIG. 3, although the pixel electrode 110, the counter electrode 204, the alignment film 111, and the like are not formed in the seal portion, the thicknesses of these films are small and therefore fall within the error range compared to a change in thickness of the color filter 201 or the overcoat film 203.

Figure 4:
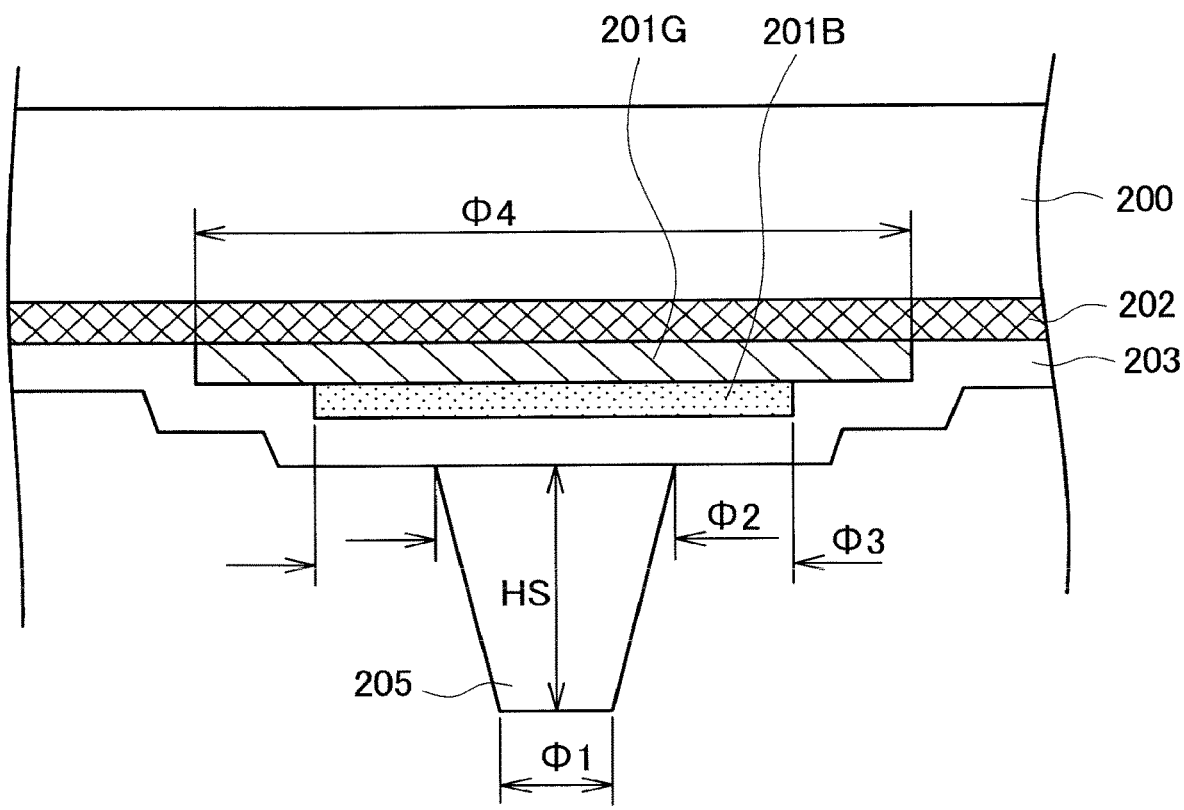
FIG. 4 is a cross-sectional view showing a structure in the vicinity of a columnar spacer according to the first embodiment.

FIG. 4 is a cross-sectional view showing the shapes of the respective films on the counter substrate 200 side in the seal portion. In FIG. 4, the black matrix 202 is formed in a solid manner on the counter substrate 200. The island-shaped green color filter 201G having a diameter φ4 is formed on the black matrix 202. The φ4 is about from 60 μm to 80 μm, for example. The island-shaped blue color filter 201B having a diameter φ3 is formed on the island-shaped green color filter 201G. The φ3 is about 40 μm, for example.

The overcoat film 203 is formed so as to cover the black matrix 202, the island-shaped green color filter 201G, and the island-shaped blue color filter 201B. The columnar spacer 205 is formed on the overcoat film 203. The height HS of the columnar spacer 205 is, for example, from 3 μm to 4 μm, which is the same as that of the display region. The columnar spacer 205 has a diameter φ2 of about 15 μm at a root and a diameter φ1 of about 10 μm at a tip end.

Figure 5:
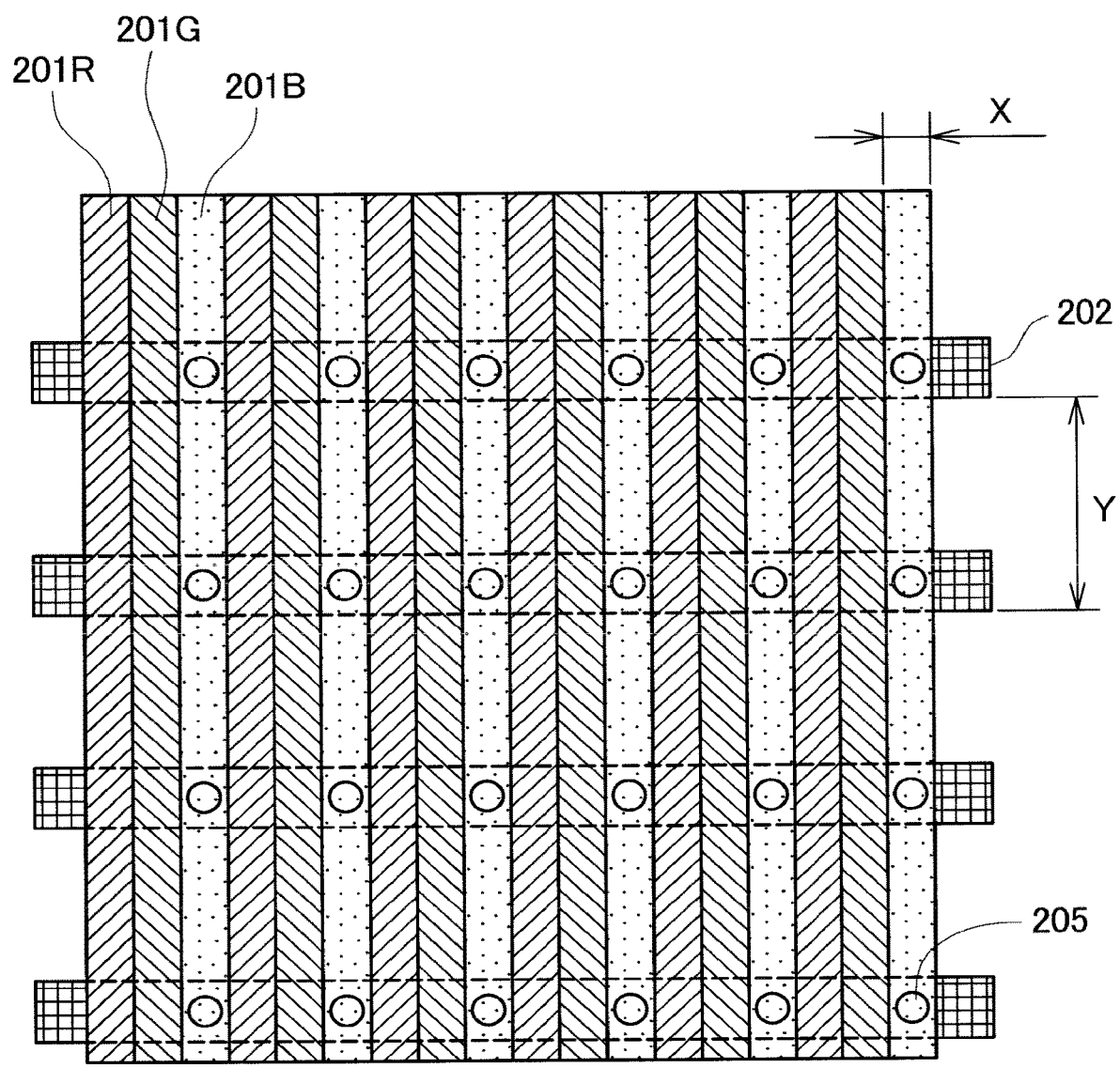
FIG. 5 is a plan view showing a display region of a counter substrate of the liquid crystal display device.

FIG. 5 is a plan view showing a part of the display region of the counter substrate 200. In FIG. 5, the black matrixes 202 are formed on the counter substrate 200 so as to extend in the horizontal direction and are arranged in the vertical direction. Red color filters 201R, the green color filters 201G, and the blue color filters 201B cover the black matrixes 202, extend in the vertical direction, and are arranged in the horizontal direction at a specified pitch. A width X of each of the color filters 201 corresponds to the transverse diameter of a sub-pixel, which is 40 μm, for example. A pitch Y of the black matrix 202 corresponds to the vertical diameter of the sub-pixel, which is 120 μm, for example.

In FIG. 5, the columnar spacers 205 are formed on the blue color filter 201B so as to correspond to portions where the black matrixes 202 are formed. FIG. 5 shows an example in which the columnar spacer 205 is formed in all sub-pixels corresponding to blue pixels. In FIG. 5, for example, the vertical pitch of the columnar spacer 205 is 120 μm, and the horizontal pitch is also 120 μm. The forming density of the columnar spacers 205 may be smaller than that. The density of the columnar spacers 205 in the display region is determined depending on the conditions of use, for example, whether the liquid crystal display device is used as a touch panel or not.

Figure 6:
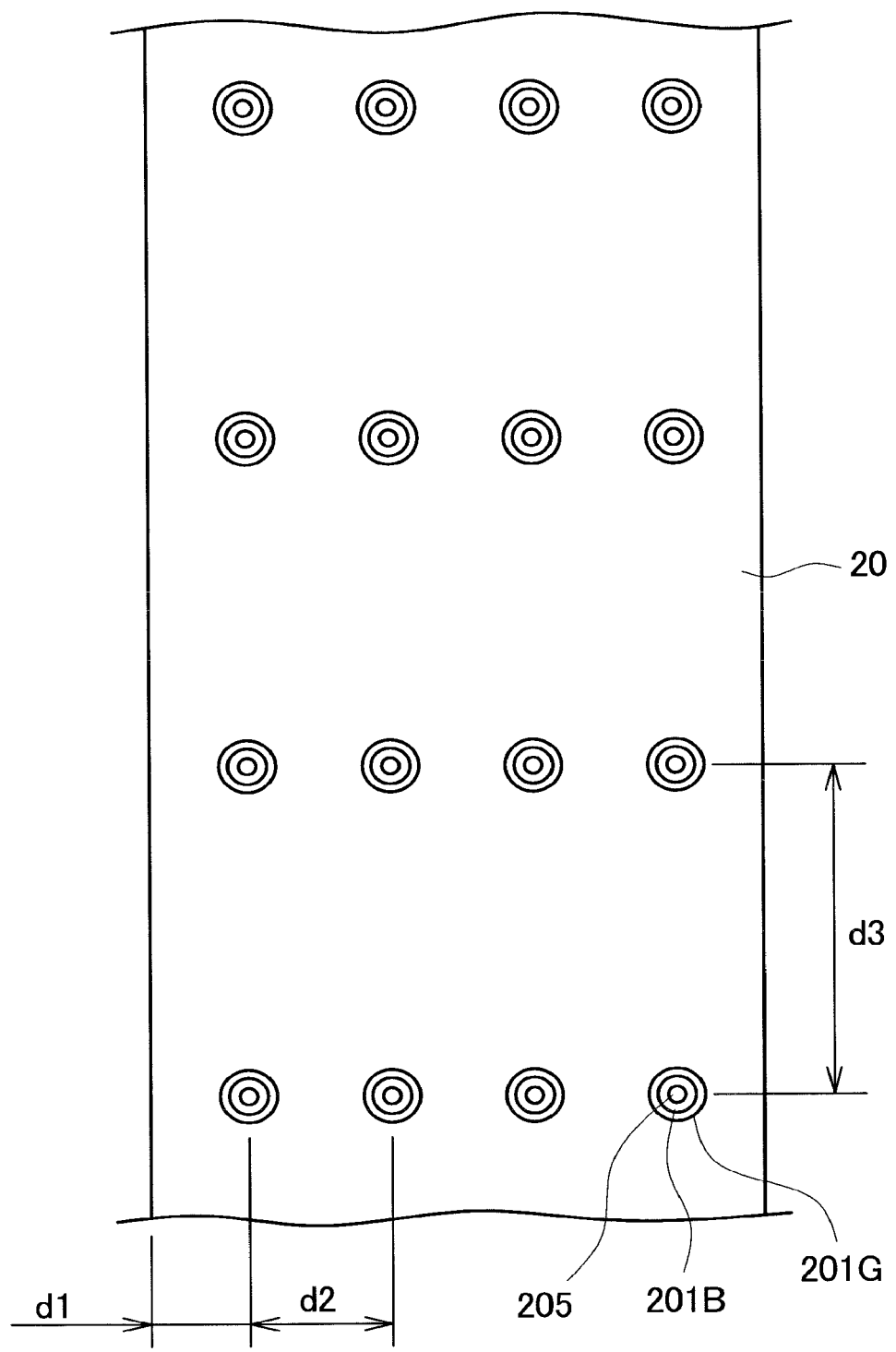
FIG. 6 is an exemplary plan view of a seal portion according to the first embodiment.

FIG. 6 is a plan view showing a seal portion of the counter substrate 200 in the invention. In the seal portion, the columnar spacers 205 are arranged at a specified pitch, and the sealing material is formed around the columnar spacers 205. Each of the columnar spacers 205 is formed on the green color filter 201G and the blue color filter 201B both formed in an island shape. In FIG. 6, the overcoat film 203 is not illustrated.

A horizontal pitch d2 of the columnar spacer 205 is, for example, 200 μm, and a vertical pitch d3 is, for example, 500 μm. A distance d1 between the columnar spacer 205 and an edge of the sealing material is, for example, 100 μm. Accordingly, the color filter 201 serving as a base of the columnar spacer 205 does not extend outside the sealing material.

Figure 7:
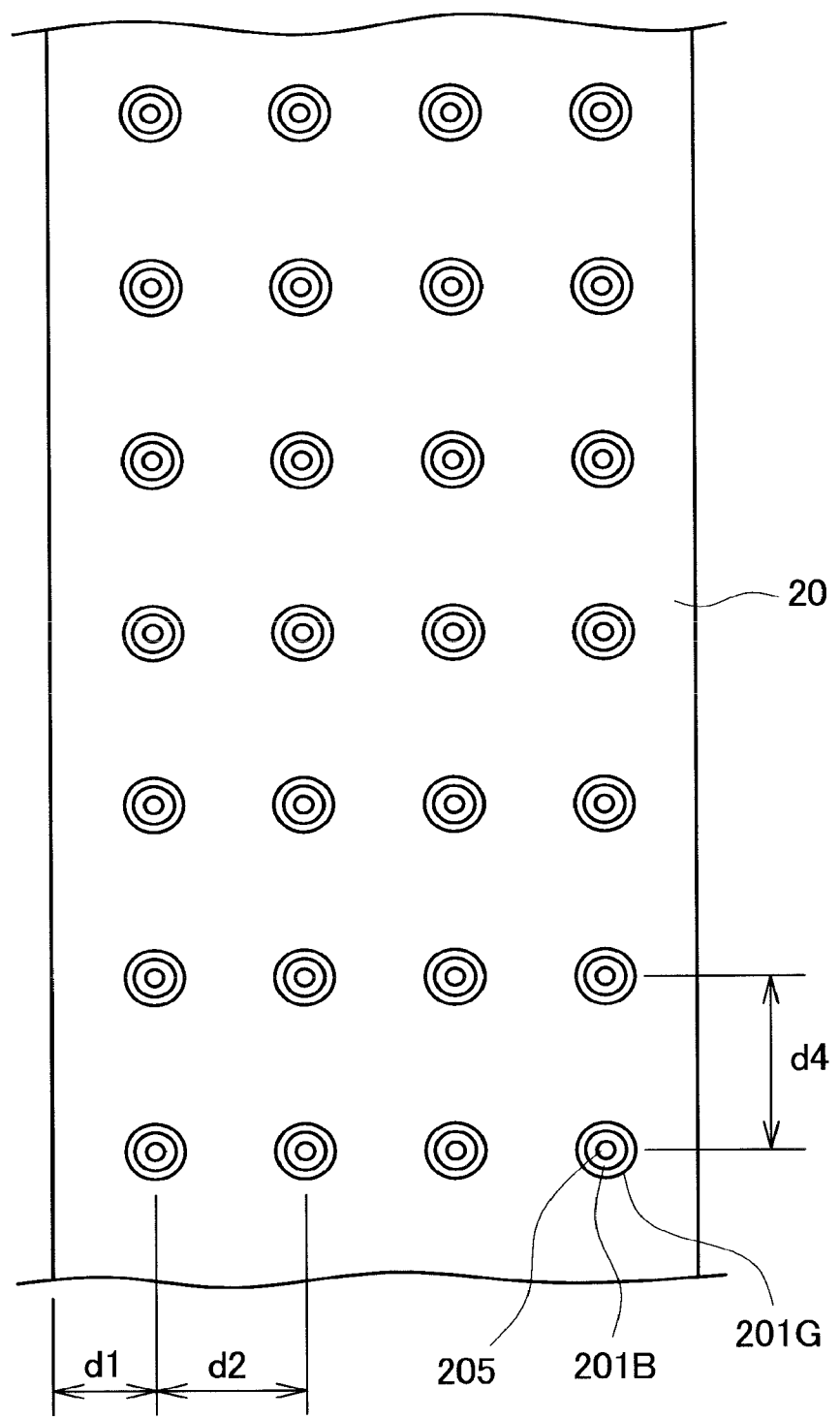
FIG. 7 is another exemplary plan view of a seal portion according to the first embodiment.

FIG. 7 is a plan view showing another example of a seal portion of the counter substrate 200 in the invention. In FIG. 7, a pitch d4 of the columnar spacer 205 in the vertical direction is reduced to half that of FIG. 6. Accordingly, the density of the columnar spacers 205 is doubled in FIG. 7 compared to that of FIG. 6.

Figure 8:
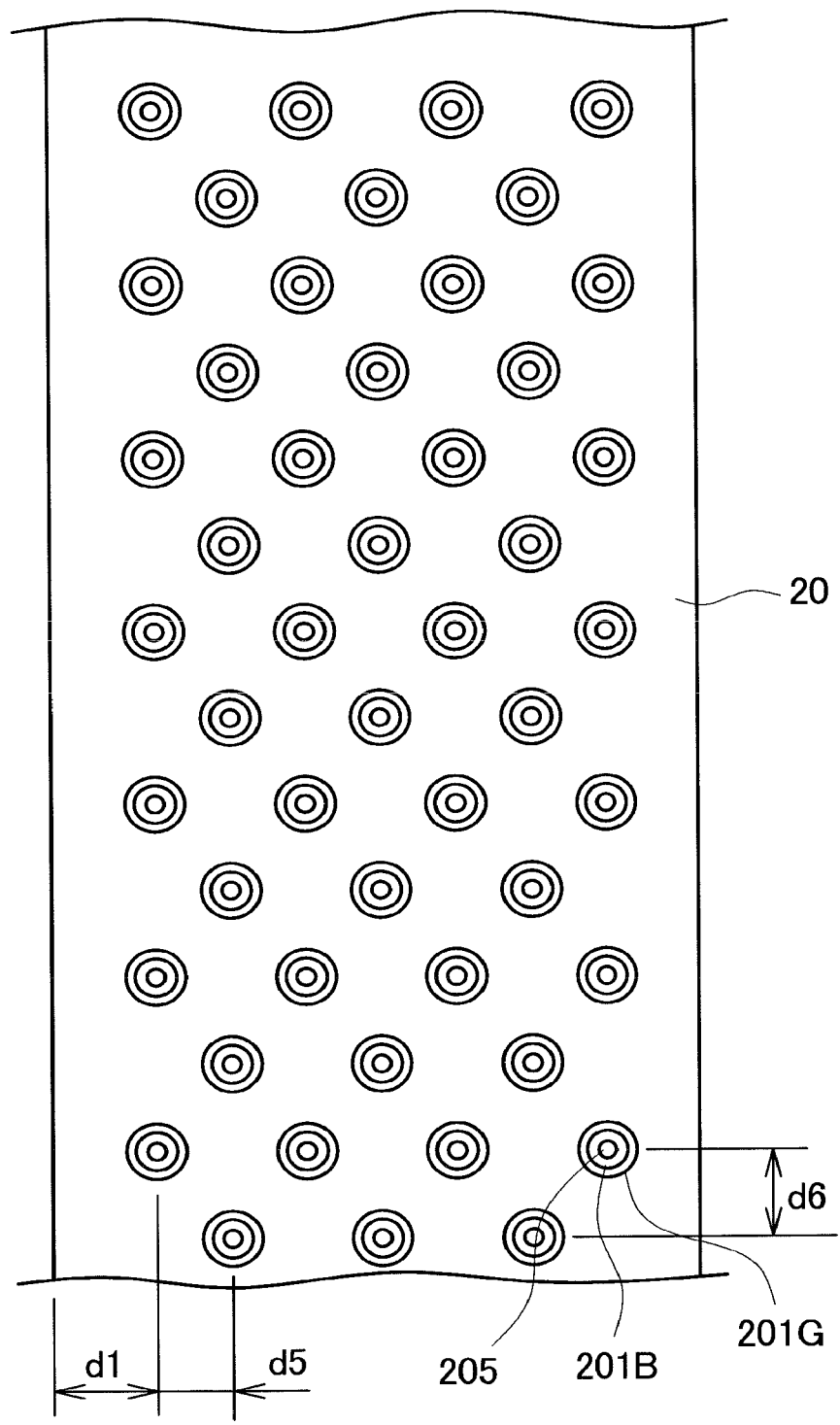
FIG. 8 is still another exemplary plan view of a seal portion according to the first embodiment.

FIG. 8 is a plan view showing still another example of a seal portion of the counter substrate 200 in the invention. In FIG. 8, a pitch d5 of the columnar spacer 205 in the horizontal direction is reduced to half the pitch d2 in the horizontal direction in FIG. 6 or 7. A pitch d6 in the vertical direction in FIG. 8 is reduced to half the pitch in the vertical direction in FIG. 7. Accordingly, the density of the columnar spacers 205 is increased more in FIG. 8 than that of FIG. 7.

FIGS. 7 and 8 show examples of the arrangement and density of the columnar spacers 205 in the seal portion, and various arrangements, in addition to the examples, can be adopted. Moreover, it is not necessary that the density of the columnar spacers 205 in the seal portion be the same as that of the display region. Depending on the intended use of the liquid crystal display device, the density of the columnar spacers 205 can be determined such that the density is most suitable for each of the display region and the seal portion.

Second Embodiment

Figure 9:
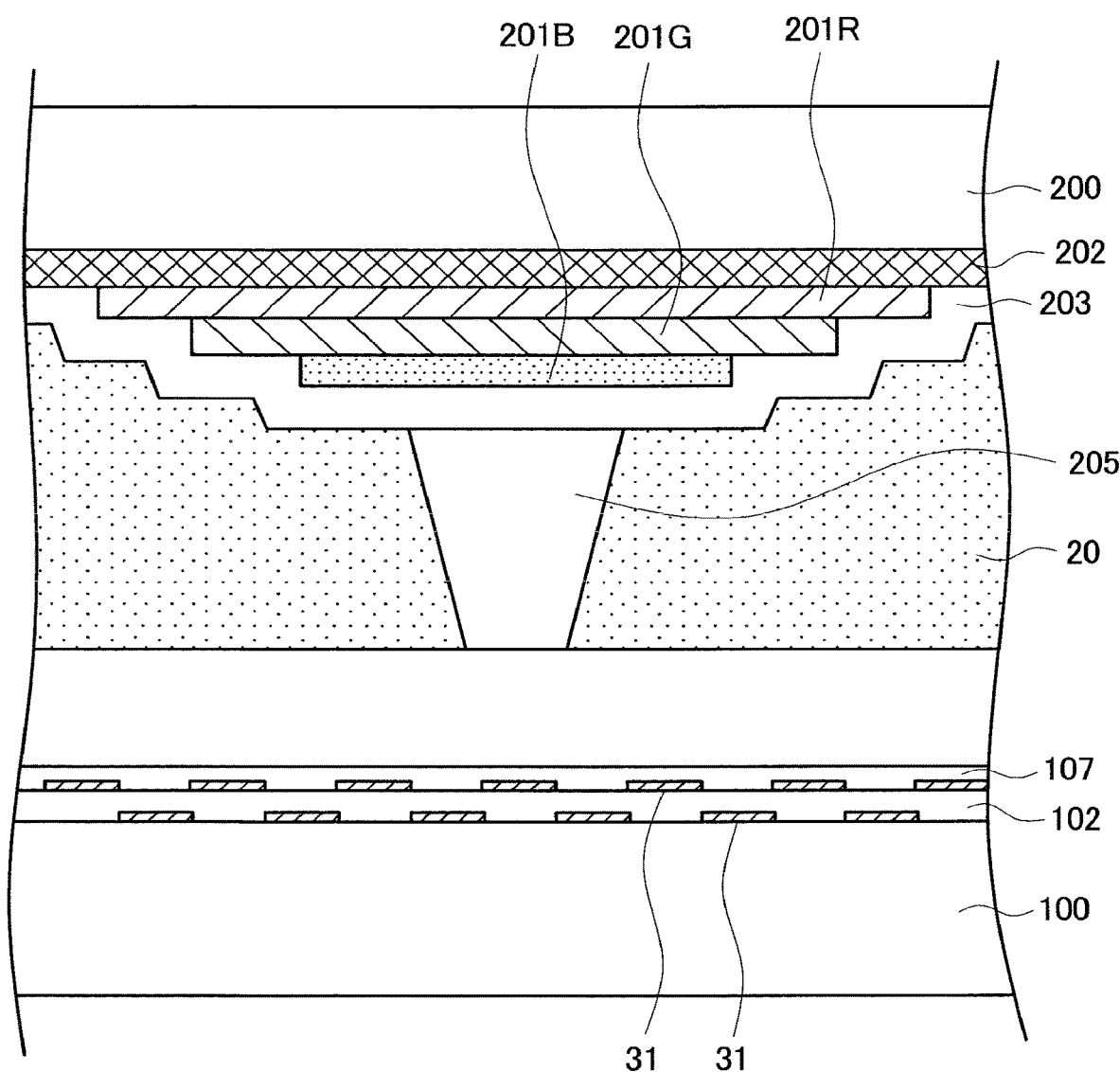
FIG. 9 is a cross-sectional view of a seal portion of a liquid crystal display device according to a second embodiment.

FIG. 9 is a cross-sectional view of a seal portion according to a second embodiment of the invention. The configuration of a display region in the embodiment is the same as that of the first embodiment. In FIG. 9, the gap between the TFT substrate 100 and the counter substrate 200 in the seal portion is determined by the columnar spacer 205 in the same manner as the first embodiment.

In the embodiment, the red color filter 201R, the green color filter 201G, and the blue color filter 201B are stacked and formed in an island shape below the columnar spacer 205 in the seal portion. Since each of the color filters 201R, 201G, and 201B is formed in an island shape, the thickness thereof is likely to be smaller than that of the color filter 201 formed in a stripe in the display region. Also the overcoat film 203 formed on the color filter becomes thin when it is formed on the island-shaped color filter due to the leveling effect.

As described above in the embodiment, the gap between the substrates is prevented from being different between the display region and the seal portion due to the reduced height of the base formed below the columnar spacer 205. In the configuration of the first embodiment, the green color filter 201G and the blue color filter 201B are formed below the columnar spacer 205, so that the gap between the substrates is controlled. In the embodiment, three layers of the color filters 201R, 201G, and 201B are formed, so that the gap between the substrates is controlled.

On the other hand, it is advantageous for the reliability of the seal portion that the pressure within the liquid crystal cell be negative rather than positive. In this case, the gap between the substrates in the seal portion is slightly greater than that of the display region. In such a case, use of the configuration of the embodiment allows stable setting of the gap between the substrates.

Figure 10:
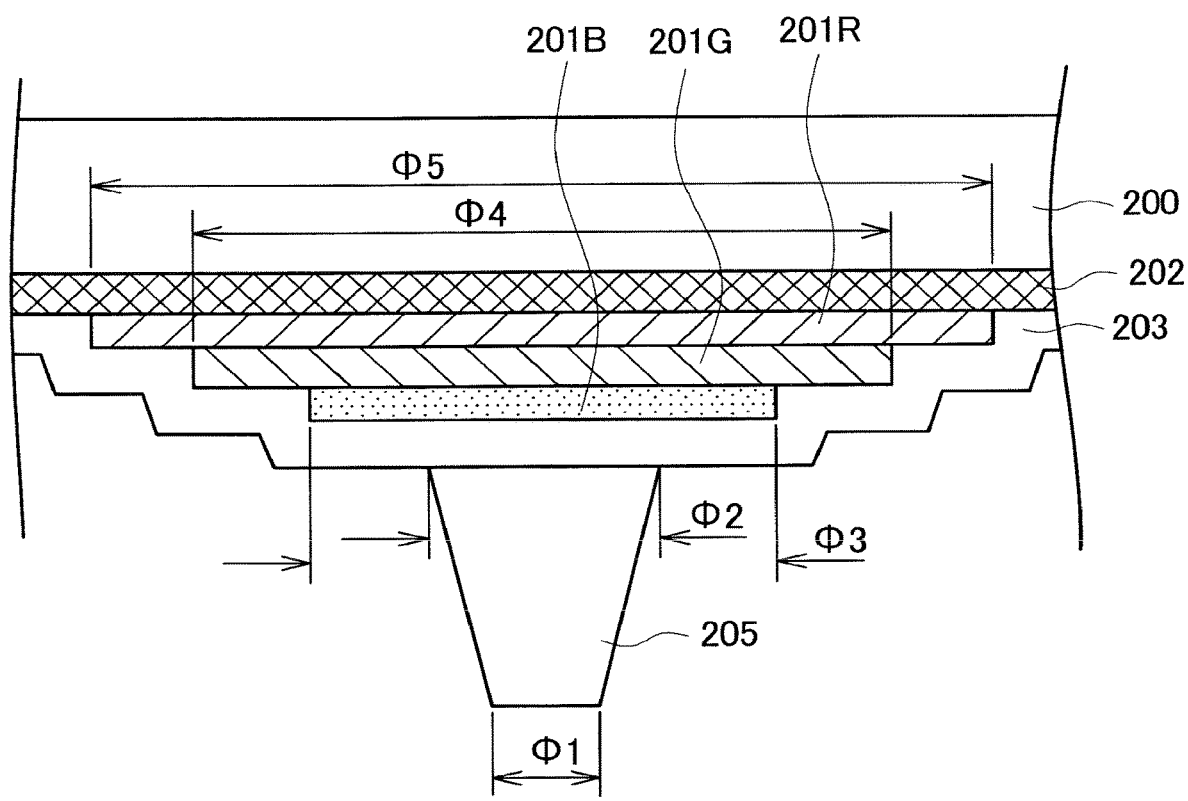
FIG. 10 is a cross-sectional view showing a structure in the vicinity of a columnar spacer according to the second embodiment.

FIG. 10 is a cross-sectional view showing the shapes of the respective films on the counter substrate 200 side in the seal portion. The configuration of FIG. 10 is the same as that of FIG. 4 except that the island-shaped red color filter 201R is additionally disposed as the base of the columnar spacer 205. Moreover, the diameter φ1 of the columnar spacer 205 at the tip end and the diameter φ2 at the root, the diameter φ3 of the island-shaped blue color filter 201B, and the diameter φ4 of the island-shaped green color filter 201G are the same as those of FIG. 4. The diameter of the island-shaped red color filter 201R in FIG. 10 is from 100 μm to 120 μm, for example.

Figure 11:
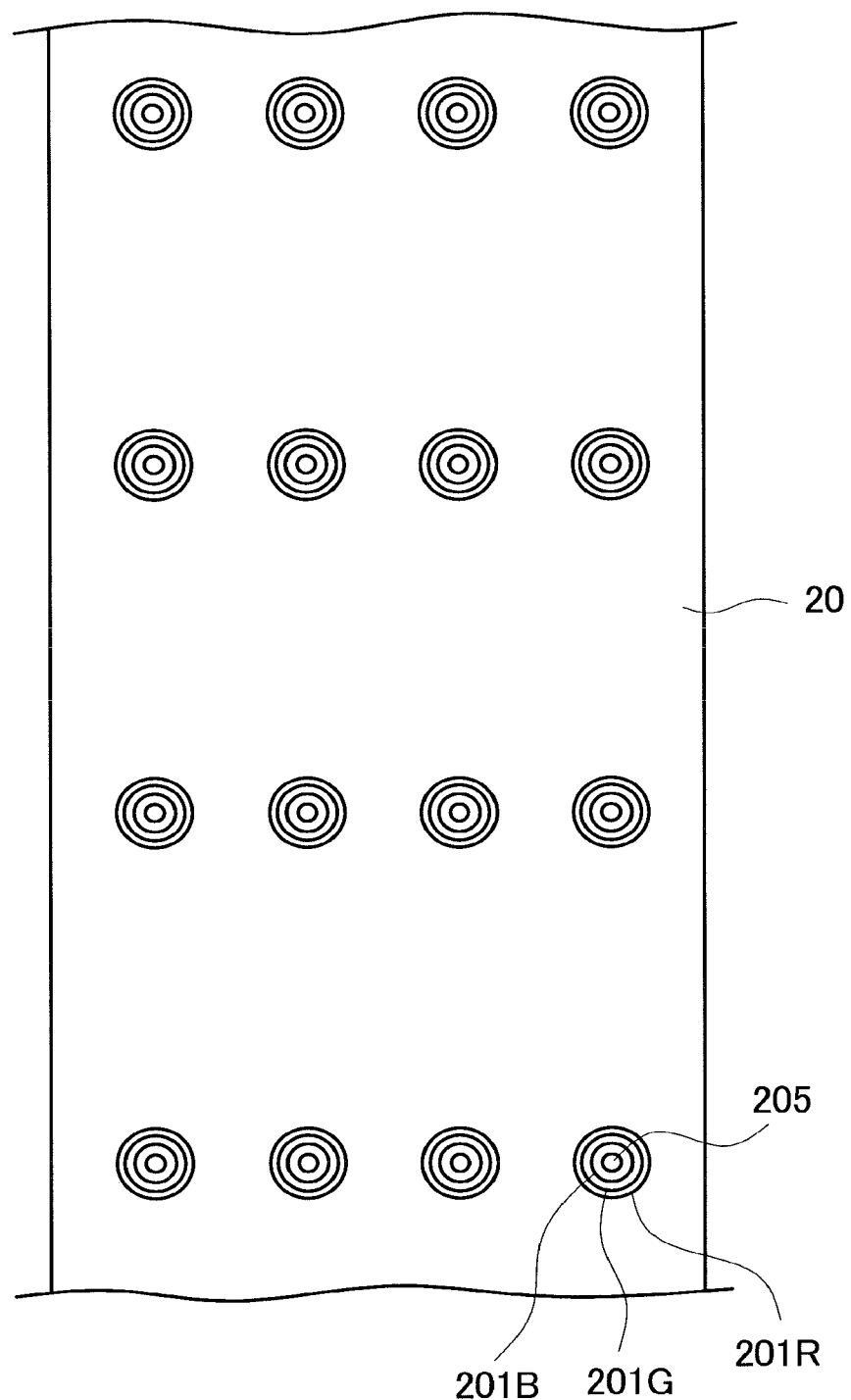
FIG. 11 is an exemplary plan view of a seal portion according to the second embodiment.

FIG. 11 is a plan view of a seal portion in the embodiment. In FIG. 11, the columnar spacers 205 are arranged at a predetermined pitch, and the sealing material is formed around the columnar spacers 205. The configuration of FIG. 11 is the same as that of FIG. 4 of the first embodiment except that the island-shaped red color filter 201R is formed, in addition to the island-shaped blue color filter 201B and the island-shaped green color filter 201G, at the portion where the columnar spacer 205 is formed.

For the arrangement of the columnar spacers 205 in the embodiment, not only the arrangement shown in FIG. 11 but also the arrangements of FIGS. 7 and 8 described in the first embodiment and other arrangements can be adopted.

Third Embodiment

Figure 12:
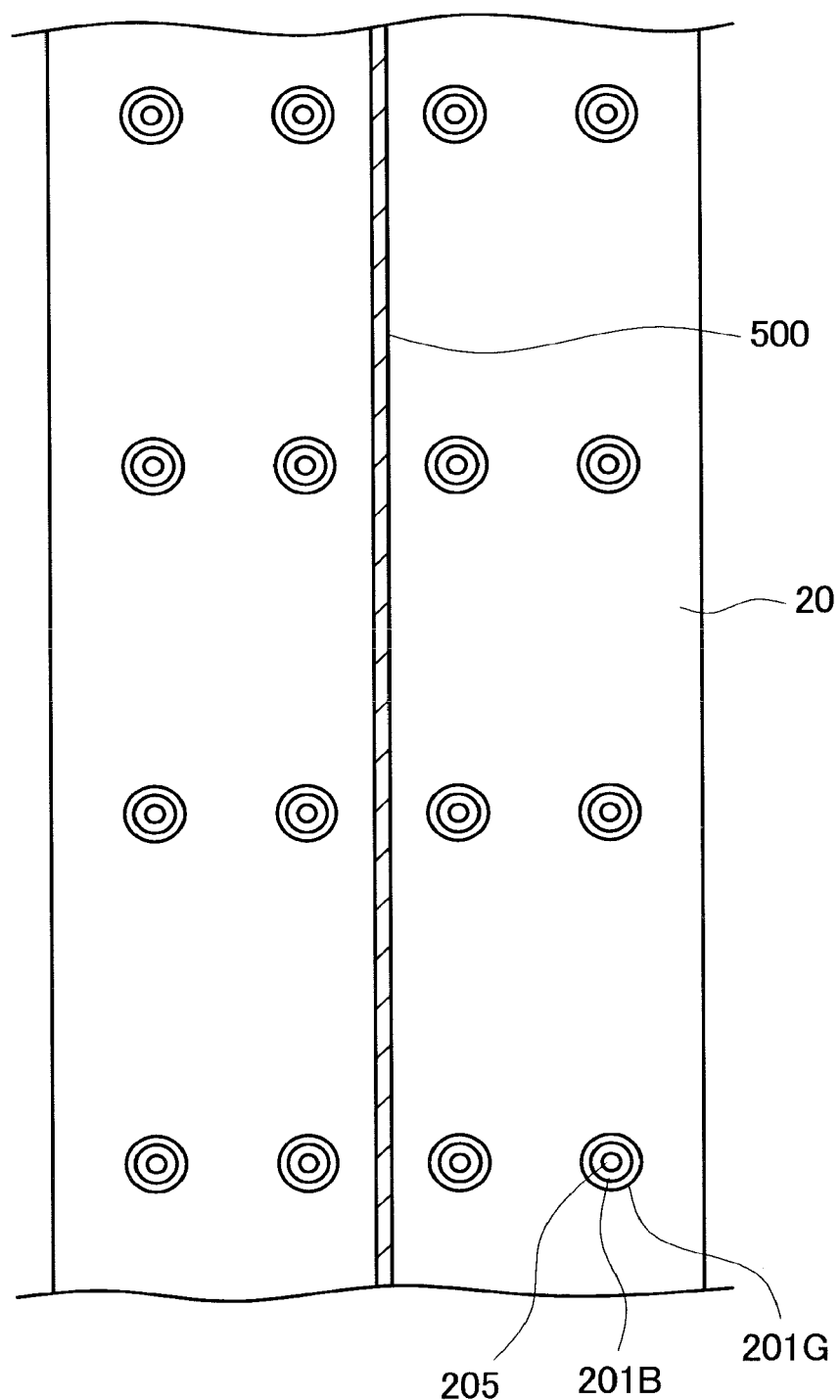
FIG. 12 is an exemplary plan view of a seal portion according to a third embodiment.

FIG. 12 is a plan view of a seal portion according to a third embodiment of the invention. The configuration of FIG. 12 is different from that of the first embodiment or the second embodiment in that a weir 500 for stopping the alignment film 111 is disposed substantially at the central portion of the seal portion. The weir 500 is formed along the entire sealing material 20.

The presence of the alignment film 111 between the sealing material and the substrate impairs the adhesive properties between the sealing material and the substrate. The alignment film 111 is applied in the display region in the form of liquid by an inkjet method or the like and thereafter solidified by baking. Upon applying the alignment film 111 in the form of liquid, when the alignment film 111 flows into the seal portion, the reliability of the seal portion is reduced.

In the embodiment, for preventing the alignment film 111 in the form of liquid from entering the entire seal portion even if the alignment film flows into the seal portion, the weir 500 for stopping the alignment film 111 is formed in the vicinity of the central portion of the seal portion. With this configuration, even if the alignment film 111 flows into the seal portion, the adhesion between the sealing material and the substrate can be sufficiently assured in the half region of the sealing material. Therefore, the reliability of the seal portion can be assured.

In FIG. 12, the weir 500 can be formed of the same material and by the same process as the columnar spacer 205. However, since the color filter 201 is not disposed below the weir 500, a tip end of the weir 500 is positioned lower than that of the columnar spacer 205 by the amount of the color filter. Accordingly, the gap between the TFT substrate 100 and the counter substrate 200 in the seal portion is defined by the columnar spacer 205.

In FIG. 12, the columnar spacers 205 are arranged so as to avoid the weir 500. The pitch, arrangement, and the like of the columnar spacers 205 in FIG. 12 is the same as those of FIG. 6 in the first embodiment. In addition, the various arrangements shown in the first embodiment can be adopted for the arrangement of the columnar spacers 205 in the seal portion as long as they are arranged so as to avoid the weir 500.

Figure 13:
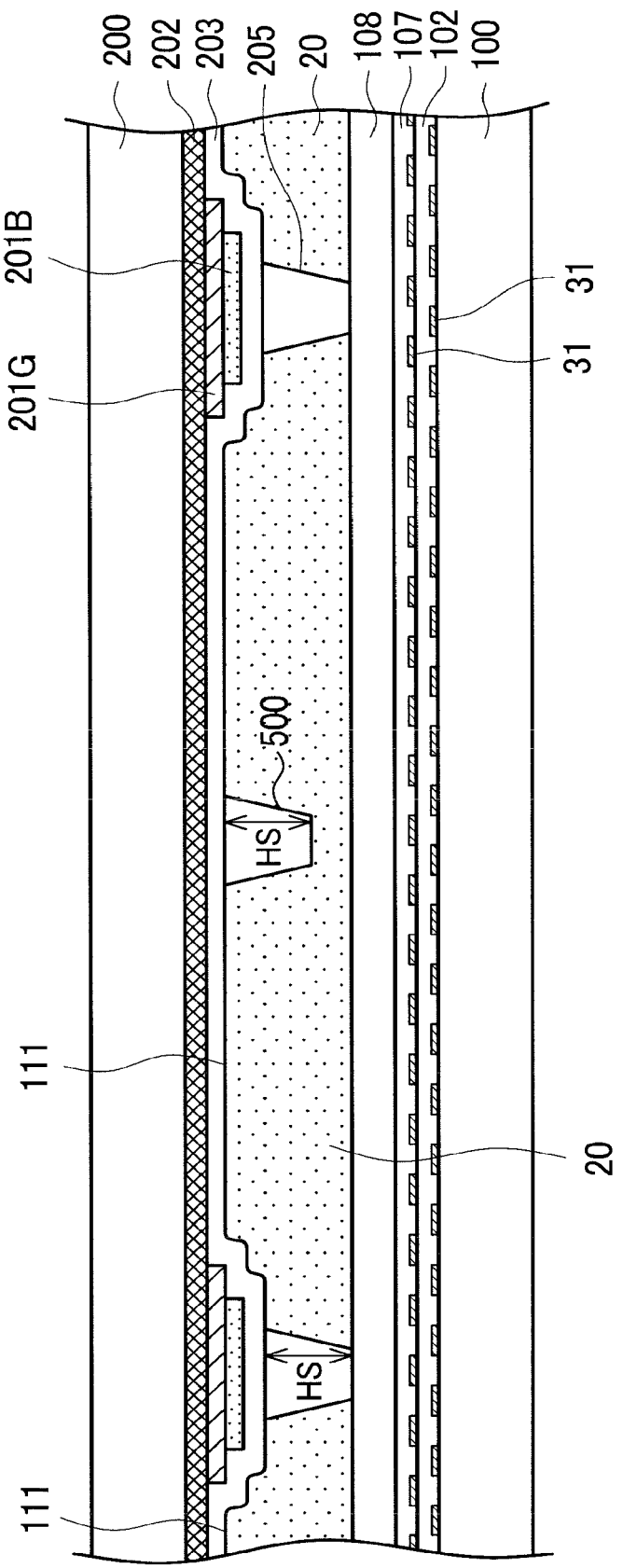
FIG. 13 is a cross-sectional view of the seal portion of a liquid crystal display device according to the third embodiment.
Figure 14:
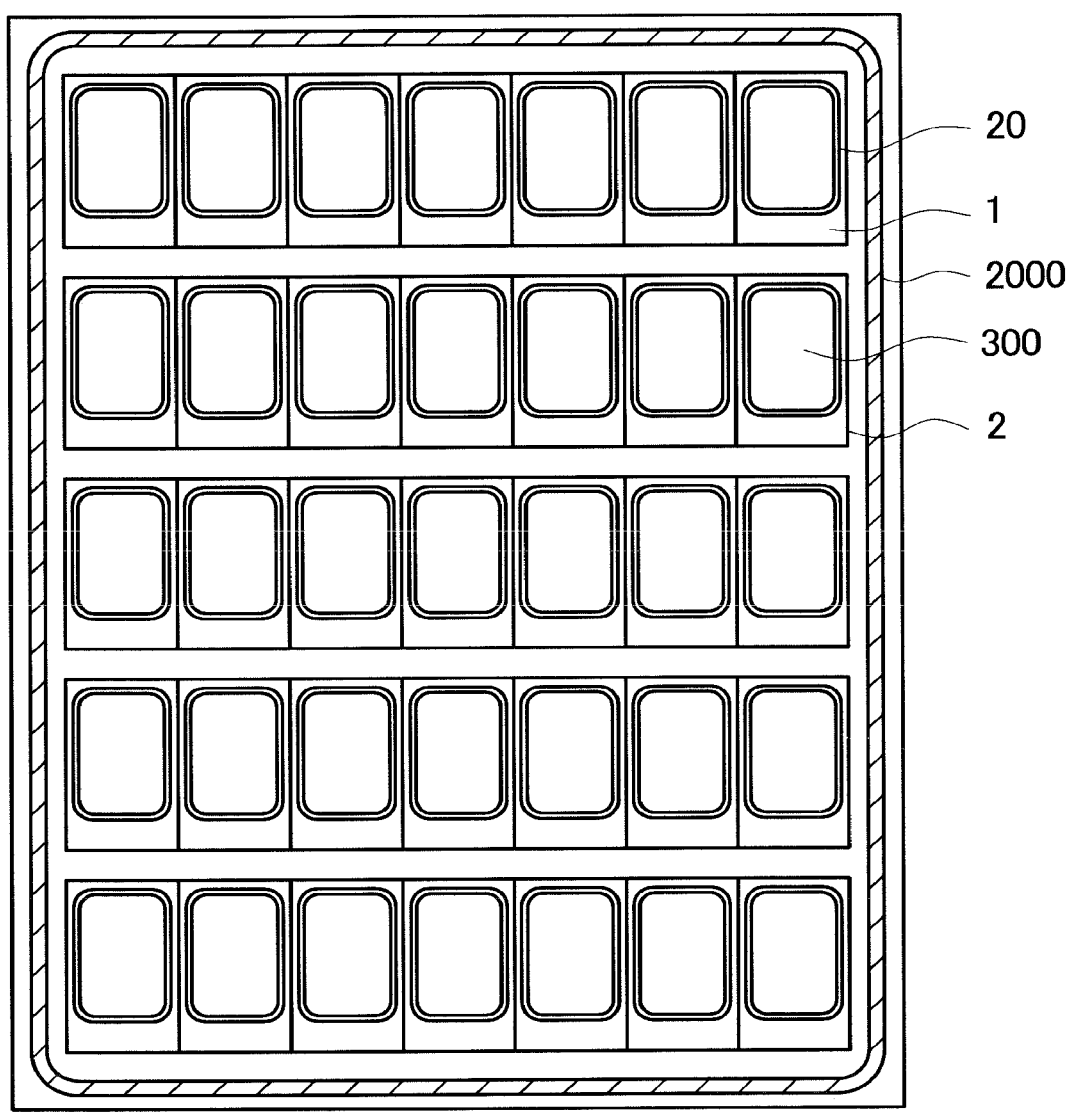
FIG. 14 is a plan view of a mother substrate.
Figure 15:
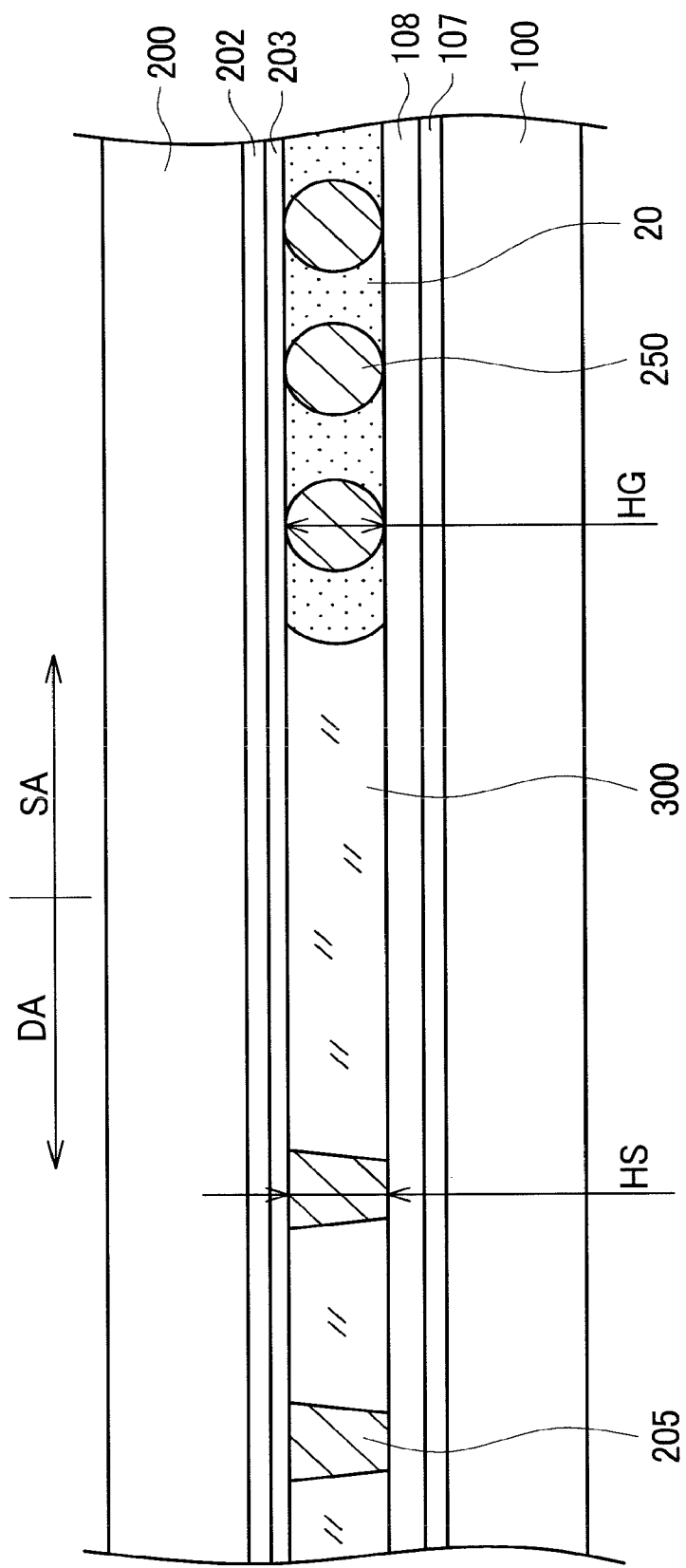
FIG. 15 shows an exemplary configuration for defining the gap between substrates in a display region and in a seal portion in the related art.
Figure 16:
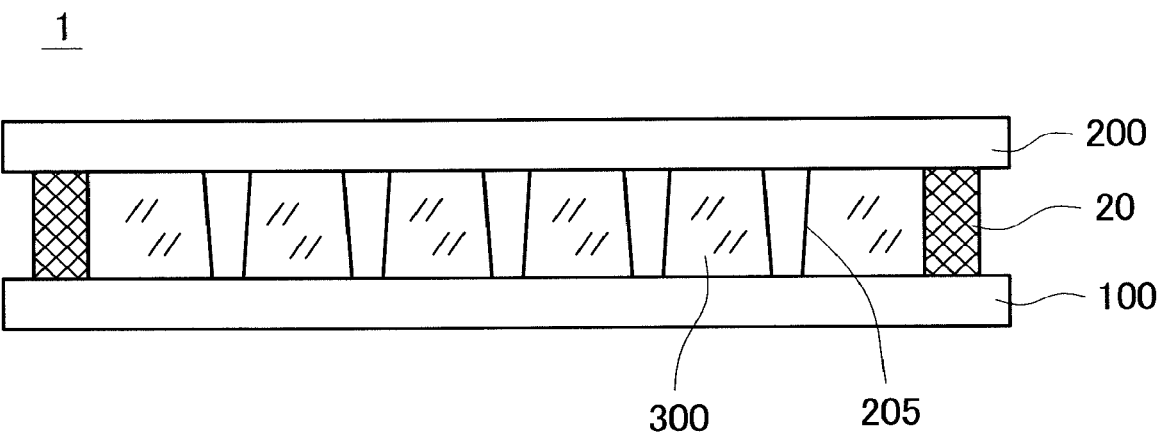
FIG. 16 is a cross-sectional view of a liquid crystal display device when the amount of liquid crystal is proper.
Figure 17:
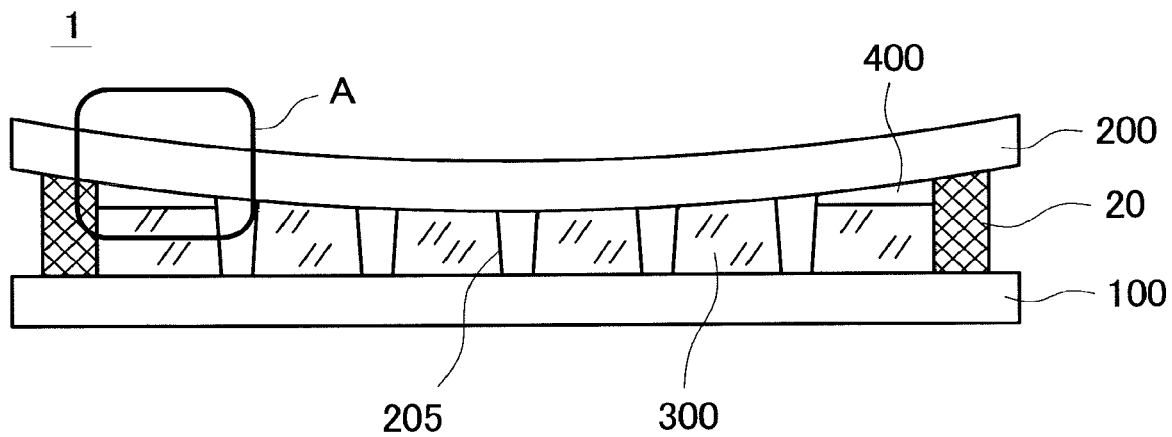
FIG. 17 is a cross-sectional view of the liquid crystal display device when the amount of liquid crystal is too small.
Figure 18:
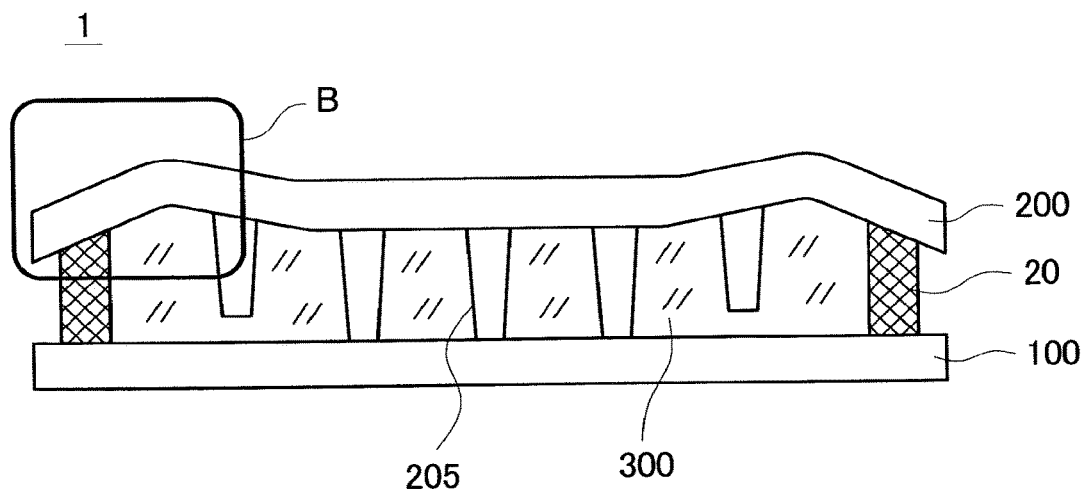
FIG. 18 is a cross-sectional view of the liquid crystal display device when the amount of liquid crystal is excessive.
Figure 19:
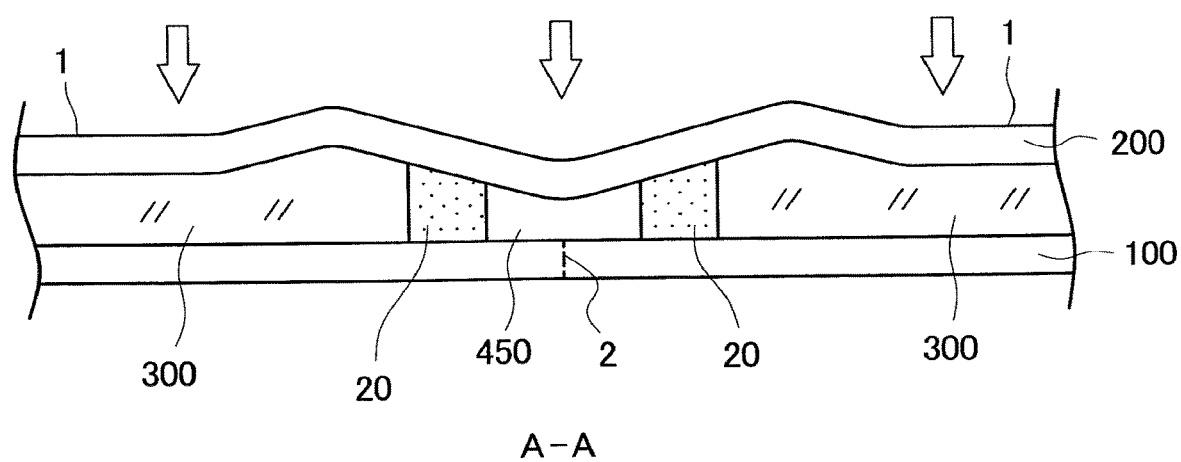
FIG. 19 is a cross-sectional view of a mother substrate when the amount of liquid crystal is excessive.

FIG. 13 is a cross-sectional view of the seal portion of the liquid crystal display device corresponding to a D-D cross-section in FIG. 12. That is, FIG. 13 shows the cross-section in which the weir 500 formed on the counter substrate 200 is interposed between the columnar spacers. In FIG. 13, the columnar spacers 205 are arranged on the counter substrate 200 side with the weir 500 interposed therebetween. The configuration of each of the columnar spacers 205 is the same as that described with reference to FIG. 3 of the first embodiment. In FIG. 13, the weir 500 is formed on the overcoat film 203. The weir 500 does not have a columnar shape but linearly extends in a direction perpendicular to the paper surface so as to surround the entire periphery of the display region.

The weir 500 is formed of the same material and by the same process as the columnar spacer 205. Accordingly, the height HS of the columnar spacer 205 is the same as the height HS of the weir 500. However, since the base formed of the green color filter 201G and the blue color filter 201B is not formed below the weir 500, the tip end of the weir 500 is positioned lower than that of the columnar spacer 205. Accordingly, the gap between the TFT substrate 100 and the counter substrate 200 in the seal portion is determined by the columnar spacer 205.

In FIG. 13, the height HS of the weir 500 is equal to the height HS of the columnar spacer 205. For the effect of stopping the alignment film 111, the height of the weir 500 may be lower than the height HS of the columnar spacer 205. For making the height of the weir 500 less than that of the columnar spacer 205, the width of the weir 500 is made less than the diameter of the columnar spacer 205. Even in the same process, the height can be made small when the width is small because of the nature of photolithography.

The display region is shown on the left of FIG. 13, where the alignment film 111 is formed. FIG. 13 shows a state where the alignment film 111 in the form of liquid flows into the seal portion when the alignment film 111 is applied in the display region, and the alignment film 111 is stopped by the weir 500. Since the alignment film does not flow outside the weir 500, the alignment film 111 is not present between the sealing material and the substrate outside the weir 500. Accordingly, high reliability can be assured in the seal portion at least outside the weir 500.

The configuration of the columnar spacer 205 formed on the counter substrate 200 in FIG. 13 is the same as that described in the first embodiment. The other configurations of the counter substrate 200 are the same as those described with reference to FIG. 1. The configuration of the TFT substrate 100 in FIG. 13 is the same as that described with reference to FIG. 3 of the first embodiment. The configuration of the display region in the embodiment is the same as that described with reference to FIG. 2 of the first embodiment.

According to the invention as described above, since the weir 500 for preventing the spreading of the alignment film into the seal portion is formed within the seal portion, even if the alignment film flows into the seal portion, the minimum adhesive strength of the sealing material can be assured. Since the weir 500 can be formed by the same process as that of the columnar spacer 205, the number of processes does not increase due to the formation of the weir 500.

While there have been described what are at present considered to be certain embodiments of the invention, it will be understood that various modifications may be made thereto, and it is intended that the appended claims cover all such modifications as fall within the true spirit and scope of the invention.

What is claimed is:

1. A display device comprising:
   a TFT substrate including a plurality of thin film transistors and a plurality of lines which supply a signal to each of the thin film transistors;
   a counter substrate including a plurality of color filters and a plurality of protrusions provided on the color filters; and
   a sealing material bonding the TFT substrate and the counter substrate, wherein
   the plurality of protrusions includes a first protrusion in a peripheral region which surrounds a display region,
   the plurality of color filters has a first portion which is separated from the color filters in the display region,
   the first protrusion and the first portion overlap the sealing material in a plan view, and
   the first portion overlaps the first protrusion, in a sectional view.

2. The display device according to claim 1, wherein the first protrusion is provided on the first portion.

3. The display device according to claim 2, wherein the sealing material is not provided between the first protrusion and the TFT substrate.

4. The display device according to claim 2, wherein the plurality of protrusions includes a second protrusion, the second protrusion is not provided on the first portion.

5. The display device according to claim 4, wherein the plurality of color filters is not provided between the second protrusion and the counter substrate.

6. The display device according to claim 4, wherein the second protrusion is extended along the display region.

7. The display device according to claim 4, wherein the sealing material is between the second protrusion and the TFT substrate.

8. The display device according to claim 1, wherein the first portion is island shaped.

9. The display device according to claim 1, wherein the first portion is a stacked portion that is different color filters stacked.

10. The display device according to claim 1, wherein the first portion overlaps one of the lines, in a sectional view.

* * * * *